UNITED STATES PATENT OFFICE.

JOHN URI LLOYD, OF CINCINNATI, OHIO.

ALKALOIDAL SUBSTANCE.

1,048,711.  Specification of Letters Patent.  Patented Dec. 31, 1912.

No Drawing.  Application filed February 23, 1912. Serial No. 679,365.

*To all whom it may concern:*

Be it known that I, JOHN URI LLOYD, a citizen of the United States of America, and resident of Cincinnati, county of Hamilton, and State of Ohio, have invented a certain new and useful Alkaloidal Substance, of which the following is a specification.

This invention is a new medicinal compound or mixture and has for an object to produce a mixture containing an alkaloidal substance such as an alkaloid or an alkaloidal salt in which the characteristically bitter alkaloidal taste is practically lacking.

I have discovered that the alkaloids and alkaloidal salts are thrown down from solution, in the form of a precipitate, when powdered fullers' earth or some other form of hydrated aluminum silicate is introduced into the solution and the mixture is agitated. I have also discovered that the form of the alkaloid in the precipitate is chemically and therapeutically the same as it was while in solution, and that the residue obtained by filtering off the liquid is devoid of taste and practically lacks the characteristically bitter taste of alkaloids and their salts.

As a specific example of the process of forming a mixture embodying my invention: Dissolve one gram of morphin sulfate in about forty cubic centimeters of water, then add fifteen grams of powdered fullers' earth to the solution and agitate the mixture. The agitation separates the morphin sulfate out of the solution in the form of a precipitate and it is carried down by the fullers' earth to the bottom of the container. The associated fullers' earth and morphin sulfate precipitate may then be removed by filtration, and it will be found that the resulting residue is practically devoid of the characteristically bitter taste of morphin sulfate. The same result may be obtained by mixing the powdered fullers' earth and morphin sulfate dry and triturating with a liquid, preferably water.

It will be understood that while I have described the process of forming a mixture containing morphin which is devoid of the characteristic alkaloidal taste, that my invention is generic and that I therefore wish it to be understood that I am not limited to the specific alkaloidal substance or the inert material specified.

What I claim is:

1. A mixture adapted for use as a medicine for internal administration and containing an alkaloidal salt and an aluminum silicate.

2. A mixture adapted for use as a medicine for internal administration containing an alkaloidal substance and powdered fullers' earth.

3. A mixture adapted for use as a medicine for internal administration containing an alkaloidal substance and powdered hydrated aluminum silicate.

4. A mixture adapted for use as a medicine for internal administration containing an alkaloidal substance and powdered aluminum silicate.

JOHN URI LLOYD.

Witnesses:
W. THORNTON BOGERT,
E. W. MCCALLISTER.